United States Patent
Xue et al.

(10) Patent No.: US 11,997,397 B2
(45) Date of Patent: May 28, 2024

(54) METHOD, APPARATUS, AND DEVICE FOR PROCESSING IMAGES, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Yachong Xue, Beijing (CN); Hao Zhang, Beijing (CN); Lili Chen, Beijing (CN); Jiankang Sun, Beijing (CN); Guixin Yan, Beijing (CN); Xiaolei Liu, Beijing (CN); Gang Li, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/790,388

(22) PCT Filed: May 25, 2021

(86) PCT No.: PCT/CN2021/095832
§ 371 (c)(1),
(2) Date: Jun. 30, 2022

(87) PCT Pub. No.: WO2021/254110
PCT Pub. Date: Dec. 23, 2021

(65) Prior Publication Data
US 2023/0345135 A1 Oct. 26, 2023

(30) Foreign Application Priority Data
Jun. 19, 2020 (CN) .......................... 202010568865.3

(51) Int. Cl.
*H04N 23/80* (2023.01)
*G06T 3/40* (2006.01)
(Continued)

(52) U.S. Cl.
CPC .............. *H04N 23/80* (2023.01); *G06T 3/40* (2013.01); *G06T 3/4038* (2013.01); *G06T 7/80* (2017.01);
(Continued)

(58) Field of Classification Search
CPC ........ H04N 23/80; H04N 25/702; G06T 7/80; G06T 3/4038; G06T 3/40; G06T 2200/32
See application file for complete search history.

(56) References Cited

U.S. PATENT DOCUMENTS 9,485,499 B2 * 11/2016 Rubinstein ............ G06T 3/0068
10,009,551 B1 * 6/2018 Adcock .................. H04N 5/265
(Continued)

FOREIGN PATENT DOCUMENTS

| CN | 104320596 A | 1/2015 |
| CN | 105282492 A | 1/2016 |

(Continued)

OTHER PUBLICATIONS

Shin, Dong-Hak, et al. "Resolution-enhanced three-dimensional image reconstruction by use of smart pixel mapping in computational integral imaging." Applied optics 47.35 (2008): 6656-6665.
(Continued)

*Primary Examiner* — Brian P Yenke
(74) *Attorney, Agent, or Firm* — IPro, PLLC

(57) ABSTRACT

Provided is a method for processing images. The method includes: acquiring a plurality of original sub-images acquired by a plurality of cameras in a camera array; converting first pixel coordinates of each pixel in each original sub-image in an image coordinate system into target
(Continued)

pixel coordinates in a target plane coordinate system; determining a region pixel value of each sub-region according to a correspondence between the target pixel coordinates of each pixel in each original sub-image and each sub-region in the target plane; and determining a spliced image in the target plane based on the region pixel value of each sub-region.

18 Claims, 3 Drawing Sheets

(51) Int. Cl.
  *G06T 3/4038*  (2024.01)
  *G06T 7/40*  (2017.01)
  *G06T 7/80*  (2017.01)
  *H04N 25/702*  (2023.01)

(52) U.S. Cl.
  CPC ....... *H04N 25/702* (2023.01); *G06T 2200/32* (2013.01)

(56) References Cited

U.S. PATENT DOCUMENTS

| | | | |
|---|---|---|---|
| 10,013,763 B1* | 7/2018 | Brailovskiy | H04N 23/698 |
| 10,121,262 B2* | 11/2018 | Katchalov | G06T 7/37 |
| 10,621,767 B2* | 4/2020 | Forutanpour | G06T 3/0037 |
| 10,803,624 B2* | 10/2020 | Ziegler | G06T 7/85 |
| 10,848,731 B2* | 11/2020 | Simek | H04N 13/106 |
| 10,848,743 B2* | 11/2020 | Rowell | H04N 23/683 |
| 11,308,579 B2* | 4/2022 | Wang | G06T 7/593 |
| 11,398,050 B2* | 7/2022 | Staudenmaier | G06T 7/60 |
| 11,455,709 B2* | 9/2022 | Wang | G06T 7/80 |
| 11,528,412 B2* | 12/2022 | Hutchinson | G06T 3/4038 |
| 11,676,366 B1* | 6/2023 | Cooke | G06V 10/60 382/154 |
| 2011/0052093 A1* | 3/2011 | Porter | H04N 5/2628 382/284 |
| 2014/0300687 A1* | 10/2014 | Gillard | G06T 15/20 348/36 |
| 2015/0062369 A1* | 3/2015 | Gehring | G06K 7/146 348/222.1 |
| 2017/0076429 A1* | 3/2017 | Russell | G06T 15/04 |
| 2017/0280070 A1 | 9/2017 | Zhou et al. | |
| 2018/0063513 A1* | 3/2018 | Bar | G03B 35/10 |
| 2018/0192033 A1* | 7/2018 | Gallup | H04N 13/275 |
| 2018/0205936 A1* | 7/2018 | Jin | H04N 13/189 |
| 2018/0316857 A1* | 11/2018 | Chen | G06T 3/4038 |
| 2019/0108615 A1* | 4/2019 | Bartels | G06T 5/50 |
| 2019/0147658 A1* | 5/2019 | Kurabayashi | G06T 7/70 345/423 |
| 2019/0158813 A1* | 5/2019 | Rowell | H04N 13/111 |
| 2019/0253681 A1* | 8/2019 | Lim | H04N 23/698 |
| 2019/0335099 A1* | 10/2019 | Zhang | H04N 23/698 |
| 2020/0036823 A1* | 1/2020 | Hsieh | H04M 1/0266 |
| 2020/0106960 A1* | 4/2020 | Aguilar | G06T 7/80 |
| 2020/0213576 A1* | 7/2020 | Mosher | H04N 13/246 |
| 2020/0213620 A1* | 7/2020 | Zhao | H04N 13/156 |
| 2022/0148225 A1* | 5/2022 | Myokan | G01B 11/00 |
| 2022/0222857 A1* | 7/2022 | Yuan | H04N 17/002 |
| 2022/0284544 A1* | 9/2022 | Holzer | G06T 3/4038 |
| 2023/0032613 A1* | 2/2023 | Duan | G06T 3/4038 |
| 2023/0252679 A1* | 8/2023 | Yu | G06T 7/80 348/180 |

FOREIGN PATENT DOCUMENTS

| | | |
|---|---|---|
| CN | 108093237 A | 5/2018 |
| CN | 111707187 A | 9/2020 |
| CN | 111738923 A | 10/2020 |

OTHER PUBLICATIONS

PCT/CN2021/095832 international search report.

* cited by examiner

METHOD, APPARATUS, AND DEVICE FOR PROCESSING IMAGES, AND STORAGE MEDIUM

CROSS-REFERENCE TO RELATED APPLICATION

The present disclosure is a U.S. national phase application bases on PCT/CN2021/095832, filed on May 25, 2021, which is based on and claims priority to Chinese Patent Application No. 202010568865.3, filed on Jun. 19, 2020 and entitled "METHOD AND DEVICE FOR PROCESSING IMAGES, AND STORAGE MEDIUM", all of which are hereby incorporated by reference in their entireties for all purposes.

TECHNICAL FIELD

The present disclosure relates to the field of image processing technologies, and relates to a method, apparatus, and device for processing images, and a storage medium.

BACKGROUND

It is difficult to acquire an ultra-high-resolution image with a single camera due to the limitation of its manufacturing process and cost. Thus, in order to acquire the ultra-high-resolution image, a user has to use a plurality of low-cost cameras to form a camera array, shoots images with all of the cameras in the camera array, and splices the shot images.

SUMMARY

The present disclosure provides a method, apparatus, and device for processing images, and a storage medium. The technical solutions are as follows.

In a first aspect, a method for processing images is provided according to an embodiment of the present disclosure. The method includes:
  acquiring a plurality of original sub-images acquired by a plurality of cameras in a camera array;
  converting first pixel coordinates of each pixel in each original sub-image in an image coordinate system into target pixel coordinates in a target plane coordinate system, the target plane coordinate system being a coordinate system established in a target plane;
  determining a region pixel value of each sub-region according to a correspondence between the target pixel coordinates of each pixel in each original sub-image and each sub-region in the target plane; and
  determining a spliced image in the target plane based on the region pixel value of each sub-region.

Optionally, the target plane is a plane where the camera array is disposed; and
  converting the first pixel coordinates of each pixel in each original sub-image in the image coordinate system into the target pixel coordinates in the target plane coordinate system includes:
  converting, according to an internal parameter matrix and an external parameter matrix of each camera in the camera array, the first pixel coordinates of each pixel in each original sub-image in the image coordinate system into second pixel coordinates in a camera array coordinate system; and taking the second pixel coordinates as the target pixel coordinates.

Optionally, the target plane is a reference plane related to a plane where the camera array is disposed; and
  converting the first pixel coordinates of each pixel in each original sub-image in the image coordinate system into the target pixel coordinates in the target plane coordinate system includes:
  converting, according to an internal parameter matrix and an external parameter matrix of each camera in the camera array, the first pixel coordinates of each pixel in each original sub-image in the image coordinate system into second pixel coordinates in a camera array coordinate system;
  determining third pixel coordinates of each pixel in a reference plane coordinate system based on the first pixel coordinates and the second pixel coordinates of each pixel in each original sub-image and a positional relationship among an image plane where the original sub-images are disposed, the reference plane, and the camera array plane; and taking the third pixel coordinates as the target pixel coordinates, wherein an intersection point exists between a straight line passing through the first pixel coordinates and the second pixel coordinates and the reference plane.

Optionally, the target plane is pre-divided into the sub-regions by:
  determining the number of the sub-regions to be acquired according to a target resolution of the spliced image; and
  determining a range of each sub-region according to the number of the sub-regions and a range of the spliced image.

Optionally, determining the region pixel value of each sub-region according to the correspondence between the target pixel coordinates of each pixel in each original sub-image and each sub-region in the target plane includes:
  determining whether a range of each sub-region covers the target pixel coordinates of any one of the pixels in the original sub-images, and the number of the target pixel coordinates covered by the range of each sub-region;
  determining, for a first sub-region whose range does not cover the target pixel coordinates, a region pixel value of the first sub-region according to a region pixel value of an adjacent sub-region of the first sub-region; and
  determining, for a second sub-region whose range covers the target pixel coordinates, a region pixel value of the second sub-region according to pixel values corresponding to all of the target pixel coordinates covered by the range of the second sub-region.

Optionally, determining, for the second sub-region whose range covers the target pixel coordinates, the region pixel value of the second sub-region according to the pixel values corresponding to all of the target pixel coordinates covered by the range of the second sub-region includes:
  taking, for the second sub-region whose range covers one set of target pixel coordinates, the pixel value corresponding to the target pixel coordinates as the region pixel value of the second sub-region; and
  determining, for the second sub-region whose range covers more than one set of target pixel coordinates, the region pixel value of the second sub-region according to the distance from each of the more than one set of the target pixel coordinates to the center of the second sub-region and a pixel value corresponding to each of the more than one set of the target pixel coordinates.

Optionally, determining the spliced image in the target plane based on the region pixel value of each sub-region includes:
  determining a pixel value of each sub-image to be spliced in the spliced image based on the region pixel value of each sub-region; and
  acquiring the spliced image by arranging all of the sub-images to be spliced according to an arrangement of all of the sub-regions in the target plane.

Optionally, prior to converting, according to the internal parameter matrix and the external parameter matrix of each camera in the camera array, the first pixel coordinates of each pixel in each original sub-image in the image coordinate system into the second pixel coordinates in the camera array coordinate system, the method further includes:
  providing a calibration plate in front of the camera array;
  acquiring a plurality of calibration images acquired upon shooting the calibration plate by each camera in the camera array; and
  determining the internal parameter matrix of any one of the cameras based on the calibration images shot by the camera.

Optionally, prior to converting, according to the internal parameter matrix and the external parameter matrix of each camera in the camera array, the first pixel coordinates of each pixel in each original sub-image in the image coordinate system into the second pixel coordinates in the camera array coordinate system, the method further includes:
  determining the external parameter matrix of each camera according to a field of view and a target shooting distance of each camera in the camera array.

In a second aspect, an apparatus for processing images is provided according to an embodiment of the present disclosure. The apparatus includes:
  an acquiring module, configured to acquire a plurality of original sub-images acquired by a plurality of cameras in a camera array;
  a converting module, configured to convert first pixel coordinates of each pixel in each original sub-image in an image coordinate system into target pixel coordinates in a target plane coordinate system, the target plane coordinate system being a coordinate system established in a target plane; and
  a determining module, configured to determine a region pixel value of each sub-region according to a correspondence between the target pixel coordinates of each pixel in each original sub-image and each sub-region in the target plane, and
  further configured to determine a spliced image in the target plane based on the region pixel value of each sub-region.

Optionally, the target plane is a plane where the camera array is disposed; and
  the converting module is specifically configured to:
  convert, according to an internal parameter matrix and an external parameter matrix of each camera in the camera array, the first pixel coordinates of each pixel in each original sub-image in the image coordinate system into second pixel coordinates in a camera array coordinate system; and take the second pixel coordinates as the target pixel coordinates.

Optionally, the target plane is a reference plane related to a plane where the camera array is disposed; and
  the converting module is specifically configured to:
  convert, according to an internal parameter matrix and an external parameter matrix of each camera in the camera array, the first pixel coordinates of each pixel in each original sub-image in the image coordinate system into second pixel coordinates in a camera array coordinate system; and
  determine third pixel coordinates of each pixel in a reference plane coordinate system according to the first pixel coordinates and the second pixel coordinates of each pixel in each original sub-image and a positional relationship among an image plane where the original sub-images are disposed, the reference plane, and the camera array plane; and take the third pixel coordinates as the target pixel coordinates, wherein an intersection point exists between a straight line passing through the first pixel coordinates and the second pixel coordinates and the reference plane.

Optionally, the target plane is pre-divided into the sub-regions by:
  determining the number of the sub-regions to be acquired according to a target resolution of the spliced image; and
  determining a range of each sub-region according to the number of the sub-regions and a range of the spliced image.

Optionally, the determining module is specifically configured to:
  determine whether a range of each sub-region covers the target pixel coordinates of any one of the pixels in the original sub-images, and the number of the target pixel coordinates covered by the range of each sub-region;
  determine, for a first sub-region whose range does not cover the target pixel coordinates, a region pixel value of the first sub-region according to a region pixel value of an adjacent sub-region of the first sub-region; and
  determine, for a second sub-region whose range covers the target pixel coordinates, a region pixel value of the second sub-region according to pixel values corresponding to all of the target pixel coordinates covered by the range of the second sub-region.

Optionally, the determining module is specifically configured to:
  take, for the second sub-region whose range covers one set of target pixel coordinates, the pixel value corresponding to the target pixel coordinates as the region pixel value of the second sub-region; and
  determine, for the second sub-region whose range covers more than one set of target pixel coordinates, the region pixel value of the second sub-region according to the distance from each of the more than one set of the target pixel coordinates to the center of the second sub-region and a pixel value corresponding to each of the more than one set of the target pixel coordinates.

Optionally, the determining module is specifically configured to:
  determine a pixel value of each sub-image to be spliced in the spliced image based on the region pixel value of each sub-region; and
  acquire the spliced image by arranging all of the sub-images to be spliced according to an arrangement of all of the sub-regions in the target plane.

Optionally, the determining module is further configured to:
  provide a calibration plate in front of the camera array;
  acquire a plurality of calibration images acquired upon shooting the calibration plate by each camera in the camera array; and
  determine the internal parameter matrix of any one of the cameras based on the calibration images shot by the camera.

Optionally, the determining module is further configured to:

determine the external parameter matrix of each camera according to a field of view and a target shooting distance of each camera in the camera array.

In a third aspect, a device for processing images is provided according to an embodiment of the present disclosure. The device includes a memory and a processor, wherein the memory is connected to the processor;

a computer program is stored in the memory; and the computer program, when executed the processor, causes the processor to perform the method for processing the images as defined in the first aspect of the present disclosure.

Optionally, the device further includes: a camera array including a plurality of cameras, wherein each of the cameras is connected to the processor, is configured to acquire an original sub-image, and provide the original sub-image to the processor.

Optionally, a pitch for each of the cameras in the camera array is determined by:

determining a pitch for a camera according to a field of view and a target shooting distance of the camera.

In a fourth aspect, a computer-readable storage medium storing a computer program therein is provided according to an embodiment of the present disclosure, wherein the computer program, when executed by a processor, causes the processor to perform the method for processing the images as defined in the first aspect of the present disclosure.

BRIEF DESCRIPTION OF THE DRAWINGS

The above and/or additional aspects and advantages of the present disclosure will be apparent and easy to understand from the following description of embodiments taken in conjunction with the accompanying drawings, wherein.

DETAILED DESCRIPTION

Figure 1:
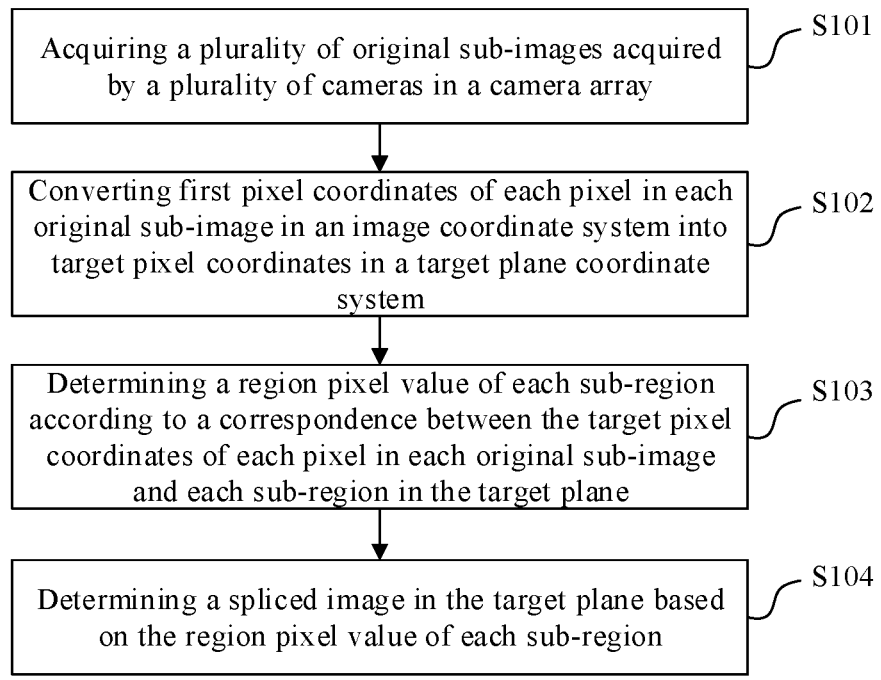
FIG. 1 is a schematic flow chart of a method for processing images according to an embodiment of the present disclosure.

The present disclosure is described in detail below, and the embodiments described below with reference to the accompanying drawings are exemplary and are only intended to explain the present disclosure, rather than being construed as limitations to the present disclosure.

It can be understood by those skilled in the art that the singular forms "a," "an" "the," and "said" as used herein can include plural forms as well, unless expressly stated otherwise. The term "and/or" as used herein includes all or any one and all combinations of one or more of the associated listed items.

First, several terms involved in the present disclosure are introduced and explained below.

Camera array coordinate system: it is also known as a camera coordinate system which is a coordinate system established on a camera. Generally, the camera coordinate system takes a light spot of the camera as a far point, the x-axis and the y-axis are parallel to two sides of an image, and the z-axis is parallel to an optical axis of the camera. The position of an object P in the camera coordinate system may be represented by (xc, yc, zc). The camera array coordinate system is defined to describe the position of the object from the camera's point of view, and is a bridge between a world coordinate system and an image coordinate system or a pixel coordinate system.

Image coordinate system: it is a coordinate system established based on an image, and is configured to specify the position of an object in the image. Generally, the image coordinate system takes the center of the image as the coordinate origin, the x-axis and the y-axis of the image coordinate system are parallel to two sides of the image, and coordinate values of the object P may be represented by (x, y). The image coordinate system is introduced to describe a projection and transmission relationship of the object from the camera coordinate system to the image coordinate system in an imaging process, so as to further acquire coordinates in the pixel coordinate system conveniently.

World coordinate system: it is an absolute coordinate system for the objective three-dimensional world, and is also known as an objective coordinate system. Before a user coordinate system is established, the position of coordinates of each of points in an image is determined based on the origin of the world coordinate system. The world coordinate system is introduced to describe the position of a target article in the real world. Coordinates of the object P in the world coordinate system are (x, y, c).

In the present disclosure, the camera array coordinate system is set to coincide with the world coordinate system.

The technical solutions of the present disclosure and how the technical solutions of the present disclosure solve the above technical problems are described in detail below with embodiments.

At present, images shot by all cameras in a camera array are spliced commonly by image splicing algorithms. The commonly-used image splicing algorithms mainly include a gray-value-based method and a feature-based method. In the two methods, the algorithms are more complicated and the splicing delay is larger since matching between features of images shot by different cameras during splicing is required. In the case that the two methods are applied to the camera array for splicing a plurality of images, a time-consuming problem becomes more serious, which are greatly limited to be used in a large-scale camera array.

A method for processing images is provided according to an embodiment of the present disclosure. As shown in FIG. 1, the method includes the following steps.

In 101, a plurality of original sub-images acquired by a plurality of cameras in a camera array are acquired.

Each camera in the camera array may acquire one original sub-image in once shooting by the camera array. For an object region in front of the camera array, each camera may shoot one object sub-region in the object region, and the original sub-images with different content are acquired by shooting the different object sub-regions with the cameras. Here, the total number, types, and acquisition frame rates of cameras included in the camera array may be determined as required. For example, the camera array may include 100 red (R)-green(G)-blue (B) cameras, the acquisition frame rate of each RGB camera may be 30 frames per second (FPS), and the 100 RBG cameras may be arranged in a 10×10 matrix.

The front of the camera array in the embodiment of the present disclosure refers to directions that lenses of all of the cameras in the camera array face, and the directions that all of the cameras in the camera array face are generally the same.

The specific content of the camera array may refer to the introduction in the following embodiments.

In 102, first pixel coordinates of each pixel in each original sub-image in an image coordinate system are converted into target pixel coordinates in a target plane coordinate system.

The image coordinate system in the embodiment of the present disclosure is a coordinate system established in an image plane, and the target plane coordinate system is a coordinate system established in a target plane. The image plane is a plane that reflects an actual object in the world coordinate system.

In an optional embodiment, the target plane is a plane where the camera array is disposed, such as a plane where camera light spots of all of the cameras in the camera array are disposed. In this embodiment, converting the first pixel coordinates of each pixel in each original sub-image in the image coordinate system into the target pixel coordinates in the target plane coordinate system includes: converting, according to an internal parameter matrix and an external parameter matrix of each camera in the camera array, the first pixel coordinates of each pixel in each original sub-image in the image coordinate system into second pixel coordinates in a camera array coordinate system; and taking the second pixel coordinates as the target pixel coordinates.

In another optional embodiment, the target plane is a reference plane related to a plane where the camera array is disposed, and an intersection point exists between a straight line passing through the first pixel coordinates and the second pixel coordinates and the reference plane. For example, the target plane is a reference plane parallel to the plane where the camera array is disposed, and the center of the reference plane is disposed on the perpendicular bisector of the plane where the camera array is disposed. In this embodiment, converting the first pixel coordinates of each pixel in each original sub-image in the image coordinate system into the target pixel coordinates in the target plane coordinate system includes: converting, according to an internal parameter matrix and an external parameter matrix of each camera in the camera array, the first pixel coordinates of each pixel in each original sub-image in the image coordinate system into second pixel coordinates in a camera array coordinate system; determining third pixel coordinates of each pixel in a reference plane coordinate system according to the first pixel coordinates and the second pixel coordinates of each pixel in each original sub-image and a positional relationship among an image plane where the original sub-images are disposed, the reference plane, and the camera array plane; and taking the third pixel coordinates as the target pixel coordinates.

In the embodiment of the present disclosure, the center of the reference plane is disposed on the perpendicular bisector at the center of the plane where the camera array is disposed. The embodiments of the present disclosure do not limit the distance between the reference plane and the plane where the camera array is disposed. In one example, the reference plane may be spaced apart from the front of the camera array by 0.5 meters (m).

Optionally, prior to converting, according to the internal parameter matrix and the external parameter matrix of each camera in the camera array, the first pixel coordinates of each pixel in each original sub-image in the image coordinate system into the second pixel coordinates in the camera array coordinate system, the method further includes: acquiring the internal parameter matrix of each camera in the camera array.

In some embodiments, acquiring the internal parameter matrix of each camera in the camera array includes: providing a calibration plate in front of the camera array; acquiring a plurality of calibration images acquired upon shooting the calibration plate by each camera in the camera array; and determining the internal parameter matrix of any one of the cameras based on the calibration images shot by the camera.

Optionally, in the case of providing the calibration plate in the embodiment of the present disclosure, the position of the calibration plate is not limited as long as each camera in the camera array can clearly shoot an image on the calibration plate. For example, the calibration plate may be spaced apart from the front of the camera array by 0.6 m to 2 m.

Optionally, during the acquisition of the calibration images acquired upon shooting the calibration plate by each camera in the camera array, the calibration images may be acquired by: rotating or twisting the calibration plate for several times to enable the calibration plate to be placed at different angles; and shooting the calibration plate after each rotating or twisting with each camera in the camera array to complete once acquisition of the calibration image, wherein each camera may acquire a plurality of calibration images by shooting the calibration plate placed at different angles, that is, the plurality of calibration images are acquired.

The embodiments of the present disclosure do not limit the number of the acquired calibration images, which may be set according to actual needs. In one example, each camera may acquire 10 or 20 calibration images by rotating or twisting the calibration plate.

The internal parameter matrix of each camera may be calculated by a specified calibration algorithm, such as Zhang's calibration method. The internal parameter matrix of a camera k may be expressed by the following expression:

$$C_K = \begin{bmatrix} ak & 0 & bk \\ 0 & ck & dk \\ 0 & 0 & ek \end{bmatrix}. \qquad (1)$$

In expression (1), k represents a label of a camera in the camera array; $C_k$ represents an internal parameter matrix of the $k^{th}$ camera; ak represents a focal length of the $k^{th}$ camera in the x-axis direction; bk represents ½ of a lateral resolution of the $k^{th}$ camera; ck represents a focal length of the $k^{th}$ camera in the y-axis direction, dk represents ½ of a longitudinal resolution of the $k^{th}$ camera, and ek represents a focal length of the $k^{th}$ camera in the z-axis direction.

Optionally, prior to converting, according to the internal parameter matrix and the external parameter matrix of each camera in the camera array, the first pixel coordinates of each pixel in each original sub-image in the image coordinate system into the second pixel coordinates in the camera array coordinate system, the method further includes: acquiring the external parameter matrix of each camera in the camera array.

In some embodiments, acquiring the external parameter matrix of each camera in the camera array includes: determining the external parameter matrix of each camera according to a field of view and a target shooting distance of each camera in the camera array.

Optionally, the field of view (FOV) of the camera may be represented by a first direction FOV and a second direction FOV of the camera, and the first direction FOV and the second direction FOV may be determined according to a resolution of the camera and a diagonal FOV of the camera. The first direction FOV may be a lateral FOV, and the second direction FOV may be a longitudinal FOV.

In one example, in the case that the resolution of the camera is 1920×1080 and the ratio of the camera resolution in the lateral direction to the longitudinal direction is 16:9, and the ratio of the lateral FOV to the longitudinal FOV of the camera is 16:9. In the case that the diagonal FOV is 15°, it can be determined that the lateral FOV of the camera is about 13°, and the longitudinal FOV of the camera is about 7.4°.

The target shooting distance in the embodiment of the present disclosure is the shortest distance that is desired to be shot, and may be set according to actual needs. In one example, the target shooting distance may be set to 20 cm, indicating that it is desired to shoot an object at 20 cm$^{-\infty}$.

The external parameter matrix of each camera may be expressed by the following expression:

$$W_k : \begin{bmatrix} 1 & 0 & 0 & Xc \\ 0 & 1 & 0 & Yc \\ 0 & 0 & 1 & Zc \end{bmatrix}. \quad (2)$$

In expression (2), k represents a label of a camera in the camera array; $W_k$ represents an external parameter matrix of the $k^{th}$ camera; Xc represents an external parameter of the camera in a first direction; Yc represents an external parameter of the camera in a second direction; and Zc represents a pitch in a depth direction of a camera (the value may be 0 in the embodiment of the present disclosure). The pitch for a camera in the embodiment of the present disclosure refers to the distance between the centers of lenses of two adjacent cameras.

Optionally, one camera in the camera array may be determined as a reference camera, and the camera external parameter in the first direction and the camera external parameter in the second direction of any one of the cameras in the camera array may be determined according to the distance between the camera and the reference camera. In the case that the cameras in the camera array are arranged in an array, since every two adjacent cameras have the same pitch (such as the lateral pitch) in the first direction and the same pitch (such as the longitudinal pitch) in the second direction, the camera external parameter of any one of the cameras in the first direction may be determined according to the pitch between every two adjacent cameras in the first direction and the number of pitches from the camera to the reference camera, and the camera external parameter of the camera in the second direction may be determined based on the pitch between every two adjacent cameras in the second direction and the number of pitches from the camera to the reference camera.

In some embodiments, assuming that the pitch between every two adjacent cameras in the first direction is Xci and the number of the pitches from any one of the cameras to the reference camera is (n−1), the camera external parameter of the camera in the first direction is Xc=Xci×(n−1). Assuming that the pitch between every two adjacent cameras in the second direction is Yci and the number of the pitches from the camera to the reference camera is (m−1), the camera external parameter of the camera in the second direction is Yc=Yci×(m−1).

Optionally, the relationship among the lateral FOV, the longitudinal FOV, the target shooting distance D, the lateral pitch Xci, and the longitudinal pitch Yci of the camera may be expressed by the following expressions:

$$Xci = D \times \tan\left(\frac{\text{lateral } FOV}{2}\right); \text{ and} \quad (3)$$

$$Yci = D \times \tan\left(\frac{\text{longitudinal } FOV}{2}\right). \quad (4)$$

In one example, in the case that each camera in the camera array has the lateral FOV of 13°, the longitudinal FOV of 7.4°, and the target shooting distance D is 20 cm, the lateral pitch (namely, Xc) between any two adjacent cameras in the camera array is:

$$20 \times \tan\left(\frac{13°}{2}\right) = 2.6 \text{ cm};$$

and the longitudinal pitch (namely, Yc) between any two adjacent cameras in the camera array is:

$$20 \times \tan\left(\frac{7.4°}{2}\right) = 1.3 \text{ cm}.$$

Accordingly, in the case that coordinates of a center of a lens of a camera disposed in the first row and first column of the camera array are set as (0, 0, 0), when pixel coordinates of an original sub-image acquired by the camera are converted as shown in expression (5), values of Xc, Yc, and Zc in the external parameter matrix $W_k$ of the camera may all be set as 0. When pixel coordinates of an original sub-image acquired by a camera disposed in the $m^{th}$ row and $n^{th}$ column of the camera array are converted as shown in expression (5), the values of Xc, Yc, and Zc in the external parameter matrix $W_k$ of the camera may be (n−1)×2.6, (m−1)×1.3, and 0, respectively.

Optionally, when converting, according to the internal parameter matrix and the external parameter matrix of each camera in the camera array, the first pixel coordinates of each pixel in each original sub-image in the image coordinate system into the second pixel coordinates in the camera array coordinate system, in the case that the first pixel coordinates in an original sub-image acquired by the $k^{th}$ camera in the image coordinate system are represented by (u, v) and the second pixel coordinates of the pixel in the camera array coordinate system are represented by (x, y, z), the conversion of the coordinates (u, v) of the first pixel to the coordinates (x, y, z) of the second pixel is as follows:

$$\begin{bmatrix} x \\ y \\ z \end{bmatrix} = \quad (5)$$

-continued $$W_k^{-1} \times C_k^{-1} \times \begin{bmatrix} u \times s \\ v \times s \\ 1 \times s \end{bmatrix} = \begin{bmatrix} 1 & 0 & 0 & X_C \\ 0 & 1 & 0 & Y_C \\ 0 & 0 & 1 & Z_C \end{bmatrix}^{-1} \times \begin{bmatrix} ak & 0 & bk \\ 0 & ck & dk \\ 0 & 0 & ek \end{bmatrix}^{-1} \times \begin{bmatrix} u \times s \\ v \times s \\ 1 \times s \end{bmatrix}.$$

In expression (5), $W_k^{-1}$ represents an inverse matrix of the external parameter matrix $W_k$ of the $k^{th}$ camera; $C_k^{-1}$ represents an inverse matrix of the internal parameter matrix $C_k$ of the $k^{th}$ camera; s represents a pixel pitch between adjacent pixels in the original sub-image to which the coordinates (u, v) of the first pixel belong; and the meaning of other parameters may refer to the previous expressions.

In the case that the target plane is a plane where the camera array is disposed, the second pixel coordinates (x, y, z) converted through the above mode may be used as the target pixel coordinates.

In the case that the target plane is a reference plane with a relative positional relationship with the camera array plane, after the second pixel coordinates are converted, it is further required to convert the second pixel coordinates into third pixel coordinates in the reference plane coordinate system, and the third pixel coordinates are used as the target pixel coordinates. The implementation of converting the second pixel coordinates into the third pixel coordinates is described below.

Since two points can determine a straight line, for any one of pixel points in an original sub-image, first pixel coordinates and second pixel coordinates of the pixel point can determine a straight line, and the straight line has an intersection point with the reference plane. Pixel coordinates of the intersection point in the reference plane coordinate system are the third pixel coordinates of the pixel point. In the case of determining the third pixel coordinates of each pixel in the reference plane coordinate system according to the first pixel coordinates and the second pixel coordinates of each pixel in each original sub-image and a positional relationship among an image plane where the original sub-image is disposed, the reference plane, and the camera array plane, first pixel coordinates of a pixel in an original sub-image in the image coordinate system are represented by (u1, v1) and second pixel coordinates of the pixel in the camera array coordinate system are represented by (x1, y1, z1), the equation of the straight line connecting the first pixel coordinates (u1, v1) and the second pixel coordinates (x1, y1, z1) is expressed by the following expression:

$$\frac{x - u1 \times s}{x1 - u1 \times s} = \frac{y - v1 \times s}{y1 - u1 \times s} = \frac{z - s}{z1 - s}. \quad (6)$$

In expression (6), the meaning of s may refer to that in expression (5).

Assuming that the equation of the reference plane is a×x+b×y+c×z=0, the coordinates of the intersection point between the straight line connecting the first pixel coordinates (u1, v1) and the second pixel coordinates (x1, y1, z1) and the reference plane can be determined based on the equation and expression (6) of the reference plane. That is, the third pixel coordinates of the pixels in the original sub-image are acquired.

Figure 2:
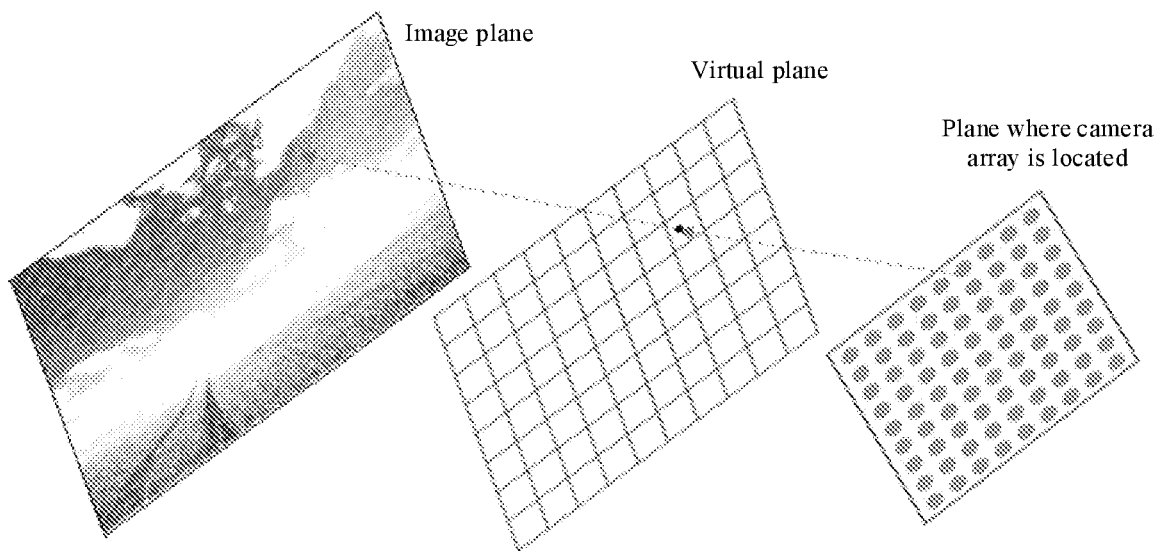
FIG. 2 is a schematic diagram of a positional relationship among an image plane, a reference plane, and a plane where the camera array is disposed according to an embodiment of the present disclosure.

Optionally, the positional relationship among the image plane, the reference plane, and the plane where the camera array is located may be as shown in FIG. 2. In the positional relationship shown in FIG. 2, the reference plane is disposed between the image plane and the camera array plane. In addition, the reference plane is parallel to the plane where the camera array is located, and the center of the reference plane is disposed on the perpendicular bisector of the plane where the camera array is located. For example, assuming that the reference plane is a virtual plane spaced apart from the front of the camera array by 0.5 m, the equation of the reference plane is z=0.5.

In 103, a region pixel value of each sub-region is determined according to a correspondence between the target pixel coordinates of each pixel in each original sub-image and each sub-region in the target plane.

Optionally, the target plane is pre-divided into the sub-regions by: determining the number of the sub-regions to be acquired according to a target resolution of the spliced image; and determining a range of each sub-region according to the number of the sub-regions and a range of the spliced image. In the embodiment of the present disclosure, the target resolution of the spliced image is a resolution of the spliced image required to be finally acquired, which may be set according to actual needs. The number of the sub-regions to be acquired may be equal to the value of the target resolution of the spliced image.

Figure 3:
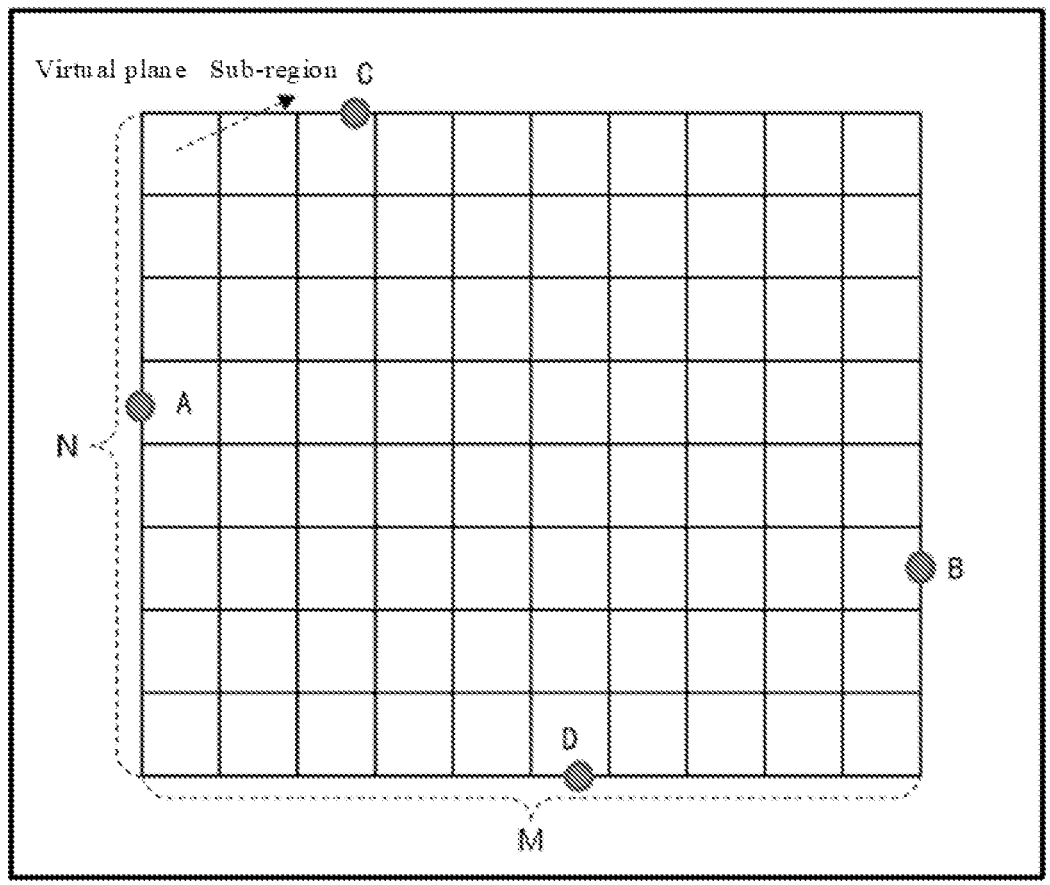
FIG. 3 is a schematic diagram of division of a target plane into sub-regions according to an embodiment of the present disclosure.

FIG. 3 shows a schematic diagram of division of a target plane into sub-regions. The points A, B, C and D marked in FIG. 3 are the boundary points of the spliced image, and are the left boundary point, right boundary point, upper boundary point, and lower boundary point of the spliced image respectively.

In one example, in the case that the target resolution is set to M×N, it is required to divide a target region into M×N sub-regions in the reference plane. In FIG. 3, in the case that it is set the coordinates of the left boundary point A as (Xl, Yl), the coordinates of the right boundary point B as (Xr, Yr), the coordinates of the upper boundary point C as (Xu, Yu), and the coordinates of the lower boundary point D as (Xd, Yd), the size of each sub-region to be acquired may be expressed by the following expression:

$$w = \frac{|X_r - X_l|}{M}, h = \frac{|Y_u - Y_d|}{N}. \quad (7)$$

In expression (7), w represents the width of the sub-region to be acquired, h represents the height of the sub-region to be acquired, and other parameters have the same meaning as before.

Upon determining the size of the sub-region to be acquired, the target region in the reference plane as shown in FIG. 3 may be divided into sub-regions. For the sub-region disposed in the $Q^{th}$ column and the $P^{th}$ row, its lateral range is (p−1)×w to p×w, and its longitudinal range is (q−1)×h to Q×h.

Optionally, whether the target pixel coordinates are contained in the sub-regions may be determined based on the determined target pixel coordinates and the range of each the sub-region (as shown in the example in FIG. 3), and a region pixel value of each sub-region is calculated in different ways according to different situations of the sub-regions and the target pixel coordinates. In some embodiments, determining the region pixel value of each sub-region according to the correspondence between the target pixel coordinates of each pixel in each original sub-image and each sub-region in the target plane includes:

determining whether a range of each sub-region covers the target pixel coordinates of any one of the pixels in the original sub-images, and the number of the target pixel coordinates covered by the range of each sub-region; determining, for a first sub-region whose range does not cover the target pixel coordinates, a region pixel value of the first sub-region according to a region pixel value of an adjacent sub-region of the first sub-region; and determining, for a second sub-region whose range covers the target pixel coordinates, a region pixel value of the second sub-region according to pixel values corresponding to all of the target pixel coordinates covered by the range of the second sub-region.

Optionally, for the first sub-region whose range does not cover the target pixel coordinates, in the case of determining the region pixel value of the first sub-region according to the region pixel value of the adjacent sub-region of the first sub-region, the embodiments of the present disclosure do not limit the positions and the number of selected adjacent sub-regions. 8 adjacent sub-regions surrounding the first sub-region may be selected, or some of the 8 adjacent sub-regions surrounding the first sub-region may be selected, or a peripheral sub-region may be further selected based on the 8 adjacent sub-regions surrounding the first sub-region, or 4 adjacent sub-regions surrounding the first sub-region may be selected, or even it may be selected based on the 4 adjacent sub-regions surrounding the first sub-region, or the like.

The greater the number of the selected adjacent sub-regions is, the more accurate the calculation result is, and meanwhile, the larger the calculation amount is. Those skilled in the art can determine the number of the selected adjacent sub-regions according to actual needs based on the above solutions provided by the embodiments of the present disclosure.

Optionally, for the selected adjacent sub-regions, a region pixel value of a current sub-region (i.e., the first sub-region whose region pixel value is to be determined) may be calculated by an interpolation algorithm. The interpolation algorithm may be a bilinear interpolation algorithm, a bicubic interpolation algorithm, a nearest neighbor interpolation algorithm, or the like.

In some embodiments, determining, for the second sub-region whose range covers the target pixel coordinates, the region pixel value of the second sub-region according to the pixel values corresponding to all of the target pixel coordinates covered by the range of the second sub-region includes:

taking, for the second sub-region whose range covers one set of target pixel coordinates, the pixel value corresponding to the target pixel coordinates as the region pixel value of the second sub-region; and for the second sub-region whose range covers more than one set of target pixel coordinates, determining the distance from each set of the target pixel coordinates in the second sub-region to a center of the second sub-region, and then, determining the region pixel value of the second sub-region according to the distance from each set of the target pixel coordinates to the center of the second sub-region and a pixel value corresponding to each of the more than one set of the target pixel coordinates.

In one example, for a second sub-region whose range covers t target pixel coordinates, in the case that the distances from all of the target pixel coordinates to the center of the second sub-region are D1, D2, . . . and Dt respectively, and pixel values corresponding all of the target pixel coordinates are F1, F2, . . . , and Ft respectively, the region pixel value of this sub-region may be determined by the following expression:

$$F = \frac{D1 \times F1 + D2 \times F2 + \cdots + Dt \times Ft}{D1 + D2 + \cdots + Dt}. \tag{8}$$

In addition, those skilled in the art can acquire the region pixel value of the second sub-region by deforming the expression (8) according to an actual needs based on the above expression (8) provided by the embodiments of the present disclosure.

Meanwhile, in some embodiments, for the second sub-region whose range covers more than one set of target pixel coordinates, any one of values such as the maximum value, minimum value, arithmetic average value, and median value of the pixel values corresponding to the target pixel coordinates may also be determined, and may be used as the region pixel value of this sub-region.

In 104, a spliced image is determined in the target plane based on the region pixel value of each sub-region.

Optionally, the pixel value of each sub-image to be spliced of the spliced image may be determined based on the region pixel value of each sub-region; and then, the spliced image formed by arranging the sub-images to be spliced according to an arrangement of all of the sub-regions in the target plane is acquired. In some embodiments, the sub-regions may be in one-to-one correspondence with the sub-images. In addition, the pixel value of any sub-image to be spliced may be equal to the region pixel value of the sub-region corresponding to the sub-image to be spliced. In the case of arranging the sub-images to be spliced according to the arrangement of all of the sub-regions in the target plane, for any sub-region, the arrangement position of the sub-region in the target plane may be determined as the arrangement position of the sub-image to be spliced corresponding to the sub-region in the spliced image. For example, for the sub-region disposed at the top left corner of the target plane, it may be determined that the sub-image to be spliced corresponding to the sub-region is disposed at the top left corner of the spliced image.

In summary, in the method for processing the images according to the embodiment of the present disclosure, the pixel coordinates of each pixel in each of the original sub-images acquired by the camera array are converted from the image coordinate system to the target plane coordinate system based on a correspondence between the image coordinate system and the target plane coordinate system, and further, the spliced image is determined by determining the region pixel value of each sub-region according to a correspondence between each set of the target pixel coordinates and each sub-region in the target plane. In the process of acquiring the spliced image based on the original sub-images, there is no need to perform feature matching on each original sub-image. Thus, the algorithm is relatively simple, and the time spent on splicing all of the original sub-images can be reduced, such that the spliced image can be acquired sooner. This method is especially suitable for a large-scale camera array, and can shorten the time and significantly improve the processing speed when processing a large number of original sub-images acquired by the large-scale camera array.

Figure 4:
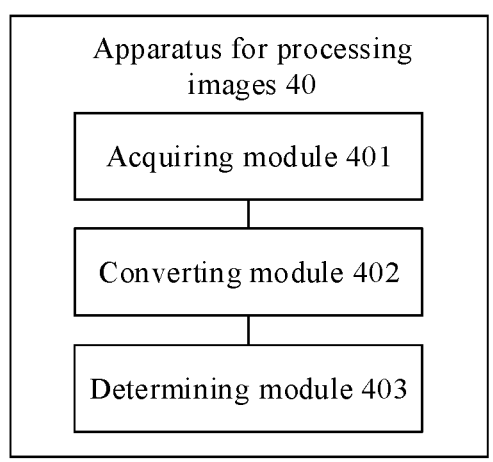
FIG. 4 is a schematic structural diagram of an apparatus for processing images according to an embodiment of the present disclosure.

An apparatus for processing images is provided according to an embodiment of the present disclosure. As shown in FIG. 4, the apparatus 40 includes the following modules.

An acquiring module 401 is configured to acquire a plurality of original sub-images acquired by a plurality of cameras in a camera array.

A converting module 402 is configured to convert first pixel coordinates of each pixel in each original sub-image in an image coordinate system into target pixel coordinates in a target plane coordinate system, the target plane coordinate system being a coordinate system established in a target plane.

A determining module 403 is configured to determine a region pixel value of each sub-region according to a correspondence between the target pixel coordinates of each pixel in each original sub-image and each sub-region in the target plane.

The determining module 403 is further configured to determine a spliced image in the target plane based on the region pixel value of each sub-region.

Optionally, the target plane is a plane where the camera array is disposed.

The converting module 402 is specifically configured to convert, according to an internal parameter matrix and an external parameter matrix of each camera in the camera array, the first pixel coordinates of each pixel in each original sub-image in the image coordinate system into second pixel coordinates in a camera array coordinate system; and take the second pixel coordinates as the target pixel coordinates.

Optionally, the target plane is a reference plane related to a plane where the camera array is disposed. Accordingly, the converting module 402 is specifically configured to:
convert, according to an internal parameter matrix and an external parameter matrix of each camera in the camera array, the first pixel coordinates of each pixel in each original sub-image in the image coordinate system into second pixel coordinates in a camera array coordinate system; and
determine third pixel coordinates of each pixel in a reference plane coordinate system according to the first pixel coordinates and the second pixel coordinates of each pixel in each original sub-image and a positional relationship among an image plane where the original sub-images are disposed, the reference plane, and the camera array plane; and use the third pixel coordinates as the target pixel coordinates, wherein an intersection point exists between a straight line passing through the first pixel coordinates and the second pixel coordinates and the reference plane.

Optionally, the target plane is pre-divided into the sub-regions by:
determining the number of the sub-regions to be acquired according to a target resolution of the spliced image; and
determining a range of each sub-region according to the number of the sub-regions and a range of the spliced image.

Optionally, the determining module 403 is specifically configured to:
determine whether a range of each sub-region covers the target pixel coordinates of any one of the pixels in the original sub-images, and the number of the target pixel coordinates covered by the range of each sub-region;
determine, for a first sub-region whose range does not cover the target pixel coordinates, a region pixel value of the first sub-region according to a region pixel value of an adjacent sub-region of the first sub-region; and
determine, for a second sub-region whose range covers the target pixel coordinates, a region pixel value of the second sub-region according to pixel values corresponding to all of the target pixel coordinates covered by the range of the second sub-region.

Optionally, the determining module 403 is specifically configured to:
take, for the second sub-region whose range covers one set of target pixel coordinates, the pixel value corresponding to the target pixel coordinates as the region pixel value of the second sub-region; and
determine, for the second sub-region whose range covers more than one set of target pixel coordinates, the region pixel value of the second sub-region according to a distance from each of the more than one set of the target pixel coordinates to a center of the second sub-region and a pixel value corresponding to each of the more than one set of the target pixel coordinates.

Optionally, the determining module 403 is specifically configured to:
determine a pixel value of each sub-image to be spliced in the spliced image based on the region pixel value of each sub-region; and
acquire the spliced image by arranging all of the sub-images to be spliced according to an arrangement of all of the sub-regions in the target plane.

Optionally, the determining module 403 is further configured to:
provide a calibration plate in front of the camera array;
acquire a plurality of calibration images acquired upon shooting the calibration plate by each camera in the camera array; and
determine the internal parameter matrix of any one of the cameras based on the calibration images shot by the camera.

Optionally, the determining module 403 is further configured to determine the external parameter matrix of each camera according to a field of view and a target shooting distance of each camera in the camera array.

In the apparatus for processing the images according to the embodiments of the present disclosure, the pixel coordinates of each pixel in each of the original sub-images acquired by the camera array are converted from the image coordinate system to the target plane coordinate system based on a correspondence between the image coordinate system and the target plane coordinate system, and further, the spliced image is determined by determining the region pixel value of each sub-region according to a correspondence between each set of the target pixel coordinates and each sub-region in the target plane. In the process of acquiring the spliced image based on the original sub-images, there is no need to perform feature matching on each original sub-image. Thus, the algorithm is relatively simple, and the time spent on splicing all of the original sub-images can be reduced, such that the spliced image can be acquired sooner. This apparatus is especially suitable for a large-scale camera array, and can shorten the time and significantly improve the processing speed when processing a large number of original sub-images acquired by the large-scale camera array.

Based on the same inventive concept, a device for processing images is provided according to an embodiment of the present disclosure. The device includes a memory and a processor, wherein the memory is connected to the processor. A computer program is stored in the memory; and the computer program, when executed the processor, causes the processor to perform any one of the methods for processing the images according to the embodiments of the present disclosure.

Optionally, the device for processing images further includes a camera array including a plurality of cameras, wherein each of the cameras is connected to the processor, is configured to acquire an original sub-image, and provide the original sub-image to the processor.

Optionally, the cameras in the camera array may be the same or different. In one example, each camera in the camera array may be an RGB camera, and camera parameters may be configured as follows: the FOV is 15°, the resolution is 1920×1080, and the frame rate in the acquisition is 30 fps.

Figure 5:
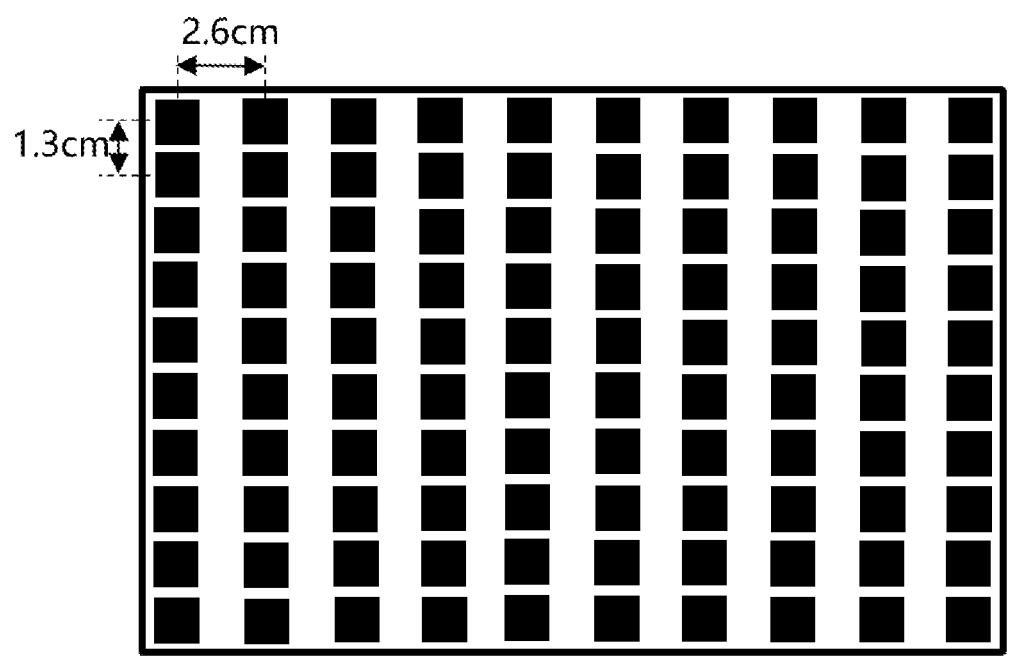
FIG. 5 is a schematic diagram of an arrangement of a camera array according to an embodiment of the disclosure.

The cameras in the camera array in the embodiment of the present disclosure may be fixed on a substrate in a rectangular arrangement as shown in FIG. 5. In FIG. 5, 100 cameras (rectangular squares in FIG. 5 represent the cameras) are taken as an example to show the arrangement of all of the cameras. FIG. 5 is only an example. The embodiments of the present disclosure do not limit the number and arrangement of the cameras in the camera array, and the number of the cameras may be any.

Optionally, a pitch for each of the cameras in the camera array is determined by determining the pitch for each of the cameras according to a field of view (FOV) and a target shooting distance of the camera.

Optionally, a pitch for a camera includes a pitch for the camera in a first direction and a pitch for the camera in a second direction.

In one example, the pitch for the camera in the first direction and the pitch for the camera in the second direction may be determined with reference to the above expressions (3) and (4), and the camera array arranged based on the determined lateral pitch (i.e., the pitch for the camera in the first direction) and the longitudinal pitch (i.e., the pitch for the camera in the second direction) is shown in FIG. 5.

In an example, for cameras with different parameters (e.g., different FOVs) in the same camera array, the pitch for the camera in the first direction and the pitch for the camera in the second direction determined with reference to the expressions (3) and (4) are different. During arranging of the cameras, for each camera in one direction, upon determining a pitch for the camera in this direction according to expression (3) or expression (4), the camera and its previous adjacent camera in this direction can be arranged based on the determined pitch for the camera.

It can be understood by those skilled in the art that the device for processing the images according to the embodiment of the present disclosure can be specially designed and manufactured as required, or may also include known devices in a general-purpose computer. These devices store one or more computer programs therein, and the computer programs are selectively activated or reconfigured. The computer program may be stored in a readable medium of a device (e.g., computer) or in any one of media suitable for storing electronic instructions and respectively coupled to the bus.

Figure 6:
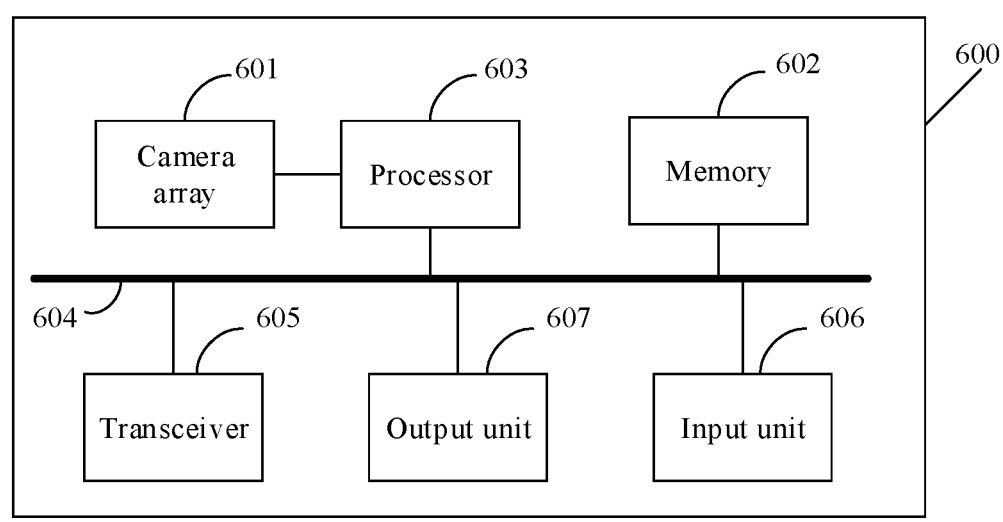
FIG. 6 is a schematic structural framework diagram of a device for processing images according to an embodiment of the present disclosure.

A device for processing images is provided according to an optional embodiment of the present disclosure. As shown in FIG. 6, the device 600 for processing the images includes a camera array 601, a memory 602, and a processor 603. The camera array 601 is communicatively connected with the processor 603, and the memory 602 and the processor 603 are electrically connected with each other via, for example, a bus 604.

The memory 602 is configured to store an application code for executing the solutions of the present disclosure, and the application code is controlled and executable by the processor 603. The processor 603 is configured to execute the application code stored in the memory 602 to perform any one of the methods for processing the images according to the embodiments of the present disclosure.

The memory 602 may be a read-only memory (ROM) or other types of static storage devices capable of storing static information and instructions, a random access memory (RAM), or other types of dynamic storage devices capable of storing information and instructions. The memory 602 may also be an electrically-erasable programmable read-only memory (EEPROM), a compact disc read-only memory (CD-ROM), or other optical disk storage, optical disk storage (including a compact disc, a laser disc, an optical disc, a digital versatile disc, a Blu-ray disc, and the like), magnetic disk storage media, or other magnetic storage devices, or any other media that can carry or store desired program codes in the form of instructions or data structures and can be accessed by a computer, but not limited to the above.

The processor 603 may be a central processing unit (CPU), a general-purpose processor, a digital signal processor (DSP), an application specific integrated circuit (ASIC), a field-programmable gate array (FPGA), or other programmable logic devices, transistor logic devices, hardware components, or any combination thereof. It can implement or execute various exemplary logical blocks, modules and circuits described in combination with the present disclosure. The processor 603 may also be a combination that can implement a computing function, and for example, may include a combination of one or more microprocessors, a combination of the DSP and the microprocessor, and the like.

The bus 604 may include a path to transfer information between the components described above, and may be a peripheral component interconnect (PCI) bus or an extended industry standard architecture (EISA) bus. The bus may be classified into an address bus, a data bus, a control bus, and the like. For convenience, it is represented by only one thick line in FIG. 6, but it does not mean that there is only one bus or one type of bus.

Optionally, the device 600 for processing the images may further include a transceiver 605. The transceiver 605 may be configured to receive and transmit signals, and may allow the electronic device 600 to be in wireless or wired communication with other devices to exchange data. It should be noted that in practice, the transceiver 605 is not limited to one.

Optionally, the device 600 for processing the images may further include an input unit 606. The input unit 606 may be configured to receive an input number, character, image, and/or sound information, or generate key signal input related to user settings and function control of the electronic device 600. The input unit 606 may include, but is not limited to, one or more of a touch screen, a physical keyboard, a function key (such as a volume control key and an on/off key), a trackball, a mouse, a joystick, a camera, a pick-up, and the like.

Optionally, the device 600 for processing the images may further include an output unit 607. The output unit 607 may be configured to output or display information processed by the processor 603. The output unit 607 may include, but is not limited to, one or more of a display apparatus, a speaker, a vibration apparatus, and the like.

Although FIG. 6 shows the device 600 for processing the images that has various means, it should be understood that not all of the illustrated means are required to be implemented or provided. More or fewer means may be alternatively implemented or provided.

Based on the same inventive concept, a computer-readable storage medium storing a computer program therein is provided according to an embodiment of the present disclosure, wherein the computer-readable storage medium may be a non-volatile storage medium; and the computer program, when executed by a processor, causes the processor to perform any one of the methods for processing the images according to the embodiments of the present disclosure.

The computer-readable medium includes, but is not limited to, any type of a disk (including a floppy disk, a hard disk, an optical disk, a CD-ROM, and a magneto-optical disk), a ROM, a RAM, an erasable programmable read-only memory (EPROM), an EEPROM, a flash memory, a magnetic card, or an optical fiber card. In other words, a readable medium includes any medium for storing or transmitting information in a form that can be read by a device (e.g., a computer).

A computer-readable storage medium suitable for any one of the above methods for processing the images is provided according to an embodiment of the present disclosure, and details are not repeated herein.

By applying the embodiments of the present disclosure, at least the following beneficial effects can be achieved.

1) In the embodiments of the present disclosure, the pixel coordinates of each pixel in each of the original sub-images acquired by the camera array are converted from the image coordinate system to the target plane coordinate system based on a correspondence between the image coordinate system and the target plane coordinate system, and further, the spliced image is determined by determining the region pixel value of each sub-region according to a correspondence between each set of the target pixel coordinates and each sub-region in the target plane. In the process of acquiring the spliced image based on the original sub-images, there is no need to perform feature matching on each original sub-image. Thus, the algorithm is relatively simple, and the time spent on splicing all of the original sub-images can be reduced, such that the spliced image can be acquired sooner. This method is more suitable for a large-scale camera array, and can shorten the time and significantly improve the processing speed when processing a large number of original sub-images acquired by the large-scale camera array.

2) In the embodiments of the present disclosure, the spliced image can be acquired by arranging the pixels of the sub-images to be spliced on the target plane (which may be the plane where the camera array is located or the reference plane that has a relative positional relationship with the plane where the camera array is located) based on the arrangement of all of the sub-regions. Thus, personalized splicing needs can be met conveniently. In the case of splicing the images based on the region pixel value of each sub-region, it is not necessary to delete overlapping regions of the images to be spliced corresponding to the sub-regions respectively. Compared with the existing algorithms that need to delete the overlapping regions, the solutions according to the embodiments of the present disclosure avoid waste of image information, such that the utilization rate of the image information is higher.

3) In the embodiments of the present disclosure, the pixel coordinates of the same pixel can be converted relatively accurately between different coordinate systems according to the internal parameter matrix and the external parameter matrix of each camera in the camera array, such that in the subsequent image processing process, the image information of each original sub-image can be restored to a greater extent, thereby reducing the loss of the image information, and facilitating the improvement of the image quality of the determined spliced image.

4) In the embodiments of the present disclosure, the plurality of calibration images can be acquired by calibrating each camera in the camera array through the provided calibration plate, such that the internal parameter matrix and the external parameter matrix of each camera can be accurately determined based on the calibration images, which facilitates the subsequent coordinate conversion.

5) In the embodiments of the present disclosure, the region pixel value of each sub-region can be determined based on the target resolution and the distribution of the determined target pixel coordinates in the sub-region. For a sub-region without the target pixel coordinates, a region pixel value of the sub-region can be determined based on a region pixel value of a neighboring sub-region, which avoids a negative influence, caused by pixel missing of the sub-region without the target pixel coordinates, on the image quality of the finally acquired spliced image. For a sub-region including the target pixel coordinates, a pixel value of this sub-region can be determined based on a pixel value corresponding to the included target pixel coordinates. Thus, a pixel for the target pixel coordinates corresponding to the sub-region can be restored to a greater extent, thereby facilitating the improvement of the quality of the spliced image. In addition, the adaptive splicing adjustment can be realized based on a required image resolution (i.e., target resolution) without the limitation of the scale of the camera array.

6) In some embodiments of the present disclosure, in the case of determining a region pixel value of a sub-region, the region pixel value of the sub-region can be determined based on the distance between each set of the target pixel coordinates in the sub-region and the coordinates of the center of the sub-region and the pixel value corresponding to each set of the target pixel coordinates. In this way, the determined region pixel value can considerably restore a pixel corresponding to target pixel coordinates which has a great influence on the pixel of the sub-region in the target pixel coordinates, such that the interference of the pixel information which has little influence is reduced on the premise of ensuring the image quality, and the spliced image with high image quality and high resolution can be acquired.

It can be understood by those skilled in the art that steps, measures, and solutions in various operations, methods, and processes discussed in the present disclosure may be alternated, modified, combined, or deleted. Further, other steps, measures, and solutions, with the various operations, methods, and processes discussed in the present disclosure, may also be alternated, modified, rearranged, split, combined, or deleted. Further, steps, measures, and solutions in the prior art, with the various operations, methods, and processes discussed in the present disclosure, may also be alternated, modified, rearranged, split, combined, or deleted.

In the description of the present disclosure, it should be understood that the terms "first" and "second" are only for description and should not be construed as indicating or implying relative importance or implicitly indicating the number of technical features indicated. Thus, the features defined by the terms "first" and "second" may include one or more of the features either explicitly or implicitly. In the description of the present disclosure, unless otherwise stated, the term "a plurality of" means two or more.

It should be understood that although the various steps in the flow chart of the accompanying drawings are sequentially displayed as indicated by the arrows, these steps are not necessarily performed in the order indicated by the arrows. Except as explicitly stated herein, the execution of these steps is not strictly limited and may be performed in other sequences. Moreover, at least some of the steps in the flow chart of the accompanying drawings may include a plurality of sub-steps or stages, which are not necessarily performed at the same time, but may be executed at different times. The execution order thereof is also not necessarily performed sequentially, but may be performed in turn or alternately with at least part of other steps or sub-steps or stages of other steps.

The above description is only some embodiments of the present disclosure, and it should be noted that those skilled in the art may also make several improvements and modifications without departing from the principles of the present disclosure which should be considered as the scope of protection of the present disclosure.

What is claimed is:

1. A method for processing images, comprising:
    acquiring a plurality of original sub-images acquired by a plurality of cameras in a camera array;
    converting first pixel coordinates of each pixel in each original sub-image in an image coordinate system into target pixel coordinates in a target plane coordinate system, the target plane coordinate system being a coordinate system established in a target plane;
    determining a region pixel value of each sub-region according to a correspondence between the target pixel coordinates of each pixel in each original sub-image and each sub-region in the target plane; and
    determining a spliced image in the target plane based on the region pixel value of each sub-region;
    wherein the target plane is pre-divided into the sub-regions by:
    determining the number of the sub-regions to be acquired according to a target resolution of the spliced image; and
    determining a range of each sub-region according to the number of the sub-regions and a range of the spliced image.

2. The method according to claim 1, wherein the target plane is a plane where the camera array is disposed; and
    said converting the first pixel coordinates of each pixel in each original sub-image in the image coordinate system into the target pixel coordinates in the target plane coordinate system comprises:
    converting, according to an internal parameter matrix and an external parameter matrix of each camera in the camera array, the first pixel coordinates of each pixel in each original sub-image in the image coordinate system into second pixel coordinates in a camera array coordinate system; and
    taking the second pixel coordinates as the target pixel coordinates.

3. The method according to claim 2, wherein prior to converting, according to the internal parameter matrix and the external parameter matrix of each camera in the camera array, the first pixel coordinates of each pixel in each original sub-image in the image coordinate system into the second pixel coordinates in the camera array coordinate system, the method further comprises:
    providing a calibration plate in front of the camera array;
    acquiring a plurality of calibration images acquired upon shooting the calibration plate by each camera in the camera array; and
    determining the internal parameter matrix of any one of the cameras based on the calibration images shot by the camera.

4. The method according to claim 2, wherein prior to converting, according to the internal parameter matrix and the external parameter matrix of each camera in the camera array, the first pixel coordinates of each pixel in each original sub-image in the image coordinate system into the second pixel coordinates in the camera array coordinate system, the method further comprises:
    determining the external parameter matrix of each camera according to a field of view and a target shooting distance of each camera in the camera array.

5. The method according to claim 1, wherein the target plane is a reference plane related to a plane where the camera array is disposed; and
    said converting the first pixel coordinates of each pixel in each original sub-image in the image coordinate system into the target pixel coordinates in the target plane coordinate system comprises:
    converting, according to an internal parameter matrix and an external parameter matrix of each camera in the camera array, the first pixel coordinates of each pixel in each original sub-image in the image coordinate system into second pixel coordinates in a camera array coordinate system;
    determining third pixel coordinates of each pixel in a reference plane coordinate system according to the first pixel coordinates and the second pixel coordinates of each pixel in each original sub-image and a positional relationship among an image plane where the original sub-images are disposed, the reference plane, and the camera array plane; and
    taking the third pixel coordinates as the target pixel coordinates, wherein an intersection point exists between a straight line passing through the first pixel coordinates and the second pixel coordinates and the reference plane.

6. The method according to claim 1, wherein said determining the region pixel value of each sub-region according to the correspondence between the target pixel coordinates of each pixel in each original sub-image and each sub-region in the target plane comprises:
    determining whether a range of each sub-region covers the target pixel coordinates of any one of the pixels in the original sub-images, and the number of the target pixel coordinates covered by the range of each sub-region;
    determining, for a first sub-region whose range does not cover the target pixel coordinates, a region pixel value of the first sub-region according to a region pixel value of an adjacent sub-region of the first sub-region; and
    determining, for a second sub-region whose range covers the target pixel coordinates, a region pixel value of the second sub-region according to pixel values corresponding to all of the target pixel coordinates covered by the range of the second sub-region.

7. The method according to claim 6, wherein said determining, for the second sub-region whose range covers the target pixel coordinates, the region pixel value of the second sub-region according to the pixel values corresponding to all of the target pixel coordinates covered by the range of the second sub-region comprises:
    taking, for the second sub-region whose range covers one set of target pixel coordinates, the pixel value corresponding to the target pixel coordinates as the region pixel value of the second sub-region; and
    determining, for the second sub-region whose range covers more than one set of target pixel coordinates, the region pixel value of the second sub-region according to a distance from each of the more than one set of the target pixel coordinates to a center of the second sub-region and a pixel value corresponding to each of the more than one set of the target pixel coordinates.

8. The method according to claim 1, wherein said determining the spliced image in the target plane based on the region pixel value of each sub-region comprises:
    determining a pixel value of each sub-image to be spliced in the spliced image based on the region pixel value of each sub-region; and
    acquiring the spliced image by arranging all of the sub-images to be spliced according to an arrangement of all of the sub-regions in the target plane.

9. An apparatus for processing images, comprising:
    a processor; and
    a memory configured to store one or more instructions executable by the processor;
    wherein the processor, when loading and executing the one or more instructions, is caused to perform:
    acquiring a plurality of original sub-images acquired by a plurality of cameras in a camera array;
    converting first pixel coordinates of each pixel in each original sub-image in an image coordinate system into target pixel coordinates in a target plane coordinate system, the target plane coordinate system being a coordinate system established in a target plane; and
    determining a region pixel value of each sub-region according to a correspondence between the target pixel coordinates of each pixel in each original sub-image and each sub-region in the target plane, and
    determining a spliced image in the target plane based on the region pixel value of each sub-region;
    wherein the target plane is pre-divided into the sub-regions by:
    determining the number of the sub-regions to be acquired according to a target resolution of the spliced image; and
    determining a range of each sub-region according to the number of the sub-regions and a range of the spliced image.

10. The apparatus according to claim 9, wherein the target plane is a plane where the camera array is disposed; and
    the processor, when loading and executing the one or more instructions, is caused to perform:
    converting, according to an internal parameter matrix and an external parameter matrix of each camera in the camera array, the first pixel coordinates of each pixel in each original sub-image in the image coordinate system into second pixel coordinates in a camera array coordinate system; and
    taking the second pixel coordinates as the target pixel coordinates.

11. The apparatus according to claim 9, wherein the target plane is a reference plane related to a plane where the camera array is disposed; and
    the processor, when loading and executing the one or more instructions, is caused to perform:
    converting, according to an internal parameter matrix and an external parameter matrix of each camera in the camera array, the first pixel coordinates of each pixel in each original sub-image in the image coordinate system into second pixel coordinates in a camera array coordinate system;
    determining third pixel coordinates of each pixel in a reference plane coordinate system according to the first pixel coordinates and the second pixel coordinates of each pixel in each original sub-image and a positional relationship among an image plane where the original sub-images are disposed, the reference plane, and the camera array plane; and
    taking the third pixel coordinates as the target pixel coordinates, wherein an intersection point exists between a straight line passing through the first pixel coordinates and the second pixel coordinates and the reference plane.

12. The apparatus according to claim 9, wherein the processor, when loading and executing the one or more instructions, is caused to perform:
    determining whether a range of each sub-region covers the target pixel coordinates of any one of the pixels in the original sub-images, and the number of the target pixel coordinates covered by the range of each sub-region;
    determining, for a first sub-region whose range does not cover the target pixel coordinates, a region pixel value of the first sub-region according to a region pixel value of an adjacent sub-region of the first sub-region; and
    determining, for a second sub-region whose range covers the target pixel coordinates, a region pixel value of the second sub-region according to pixel values corresponding to all of the target pixel coordinates covered by the range of the second sub-region.

13. The apparatus according to claim 12, wherein the processor, when loading and executing the one or more instructions, is caused to perform:
    taking, for the second sub-region whose range covers one set of target pixel coordinates, the pixel value corresponding to the target pixel coordinates as the region pixel value of the second sub-region; and
    determining, for the second sub-region whose range covers more than one set of target pixel coordinates, the region pixel value of the second sub-region according to a distance from each of the more than one set of the target pixel coordinates to a center of the second sub-region and a pixel value corresponding to each of the more than one set of the target pixel coordinates.

14. The apparatus according to claim 9, wherein the processor, when loading and executing the one or more instructions, is caused to perform:
    determining a pixel value of each sub-image to be spliced in the spliced image based on the region pixel value of each sub-region; and
    acquiring the spliced image by arranging all of the sub-images to be spliced according to an arrangement of all of the sub-regions in the target plane.

15. A device for processing images, comprising a memory and a processor, wherein the memory is connected to the processor;
    a computer program is stored in the memory; and the computer program, when executed the processor, causes the processor to perform the method for processing the images as defined in claim 1.

16. The device according to claim 15, further comprising: a camera array comprising a plurality of cameras, wherein each of the cameras is connected to the processor, is configured to acquire an original sub-image, and provide the original sub-image to the processor.

17. The device according to claim 16, wherein a pitch for each of the cameras in the camera array is determined by:
    determining a pitch for a camera according to a field of view and a target shooting distance of the camera.

18. A non-transitory computer-readable storage medium storing a computer program therein, wherein the computer program, when executed by a processor, causes the processor to perform the method for processing the images as defined in claim 1.

\* \* \* \* \*

UNITED STATES PATENT AND TRADEMARK OFFICE
CERTIFICATE OF CORRECTION

| | | |
|---|---|---|
| PATENT NO. | : 11,997,397 B2 | Page 1 of 1 |
| APPLICATION NO. | : 17/790388 | |
| DATED | : May 28, 2024 | |
| INVENTOR(S) | : Yachong Xue et al. | |

It is certified that error appears in the above-identified patent and that said Letters Patent is hereby corrected as shown below:

On the Title Page

The correct order of item (71) the applicants and the correct order of the assignees are:
BEIJING BOE OPTOELECTRONICS TECHNOLOGY CO., LTD.
BOE TECHNOLOGY GROUP CO., LTD.

Signed and Sealed this
Eighteenth Day of June, 2024

Katherine Kelly Vidal
*Director of the United States Patent and Trademark Office*